United States Patent [19]
Baversten

[11] Patent Number: 5,488,643
[45] Date of Patent: Jan. 30, 1996

[54] METHOD AND APPARATUS FOR SUPPORTING A SHROUD IN A NUCLEAR REACTOR

[75] Inventor: Bengt I. Baversten, Weatogue, Conn.

[73] Assignee: Combustion Engineering, Inc., Windsor, Conn.

[21] Appl. No.: 241,441

[22] Filed: May 11, 1994

[51] Int. Cl.$^6$ ................................. G21C 19/28
[52] U.S. Cl. ................ 376/390; 376/461; 376/303; 376/293; 376/304
[58] Field of Search ................ 376/461, 303, 376/293, 304, 390; 976/DIG. 168

[56] References Cited

U.S. PATENT DOCUMENTS

| | | | |
|---|---|---|---|
| 3,607,642 | 9/1971 | Murdock | 376/447 |
| 3,627,634 | 12/1971 | Guenther | 376/303 |
| 3,660,231 | 5/1972 | Fox et al. | 376/384 |
| 3,850,795 | 11/1974 | Thome | 376/463 |
| 4,001,079 | 1/1977 | Rylatt | 376/290 |
| 4,097,332 | 6/1978 | Gibbons et al. | 376/364 |
| 4,199,403 | 4/1980 | Puri et al. | 376/302 |
| 4,379,119 | 4/1983 | Fujimoto | 376/302 |
| 4,409,179 | 10/1983 | Burger | 376/302 |
| 4,654,188 | 3/1987 | Hankinson | 376/260 |
| 5,283,809 | 2/1994 | Challberg et al. | 376/260 |

FOREIGN PATENT DOCUMENTS 1271594  4/1972  United Kingdom.

*Primary Examiner*—Donald P. Walsh
*Assistant Examiner*—Meena Chelliah
*Attorney, Agent, or Firm*—Ronald P. Kananen; John H. Mulholland

[57] ABSTRACT

In order to eliminate the need to weld, drill or otherwise machine a shroud structure which is used to surround a plurality of fuel assemblies in a nuclear reactor, a plurality of upper hanger rods interconnect a structure above the shroud to a support ring which is clamped about the upper periphery of the shroud. Lower hanger rods interconnect a lower edge or shoulder portion of the shroud with the support ring. Thus, through the upper and lower hanger rods and the support ring, the shroud can be supported within the RPV. The upper support ring is arranged to clamp the lower ends of the upper hanger rods against the upper outer peripheral portion of the shroud while the lower ends of the lower hanger rods are clamped against the lower peripheral wall portion of the shroud by a lower support ring.

3 Claims, 6 Drawing Sheets

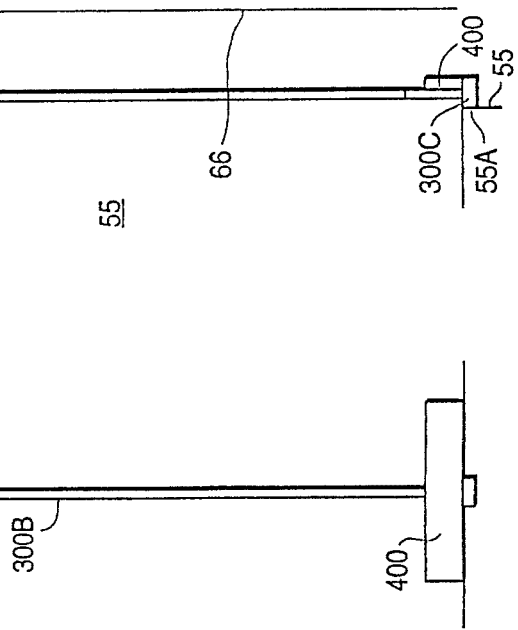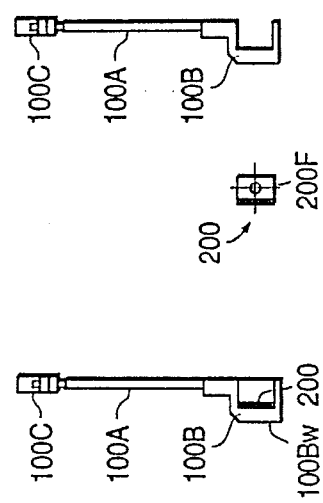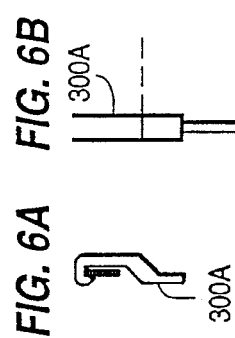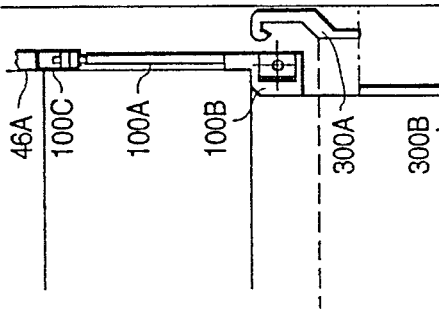

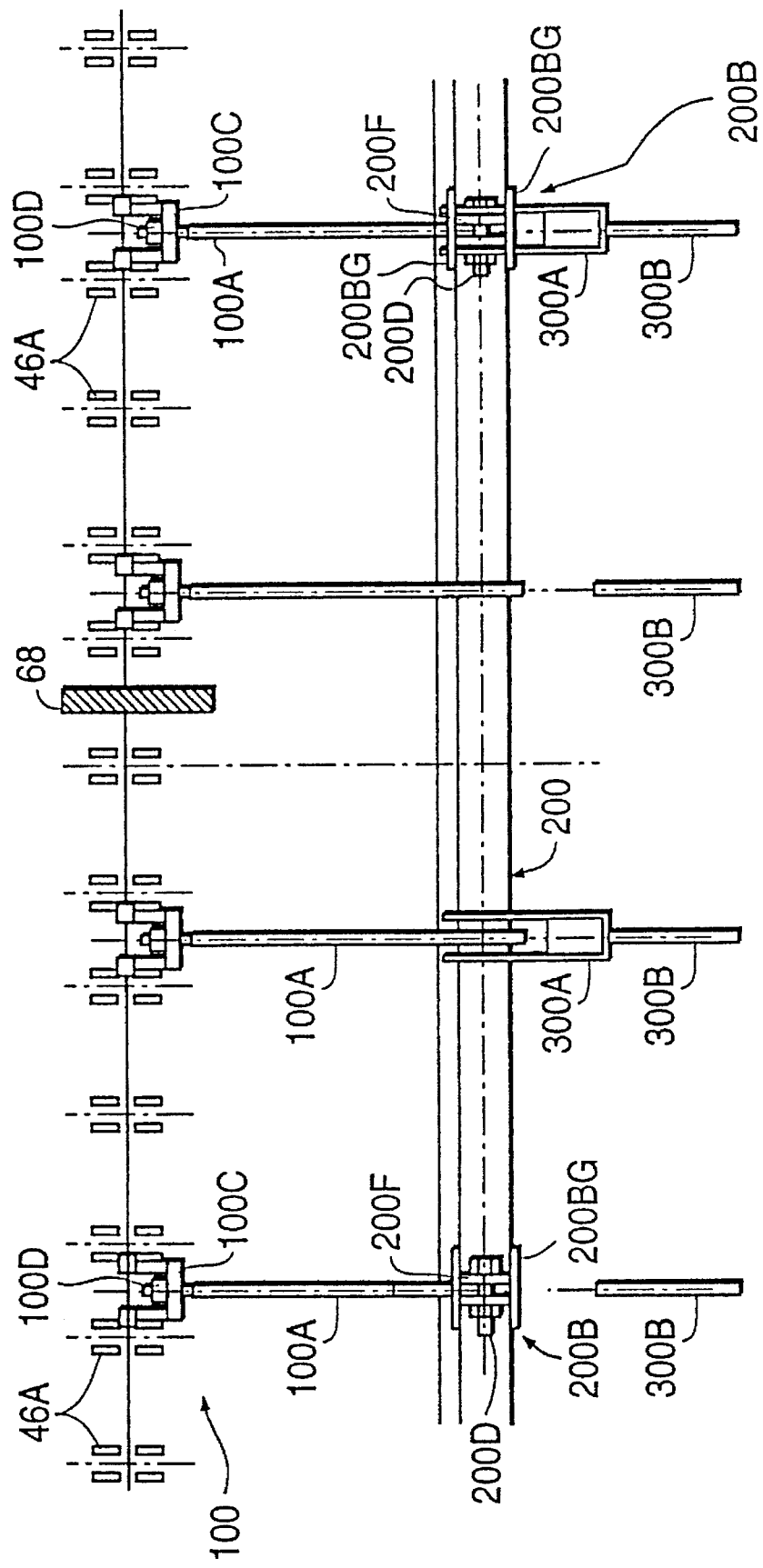

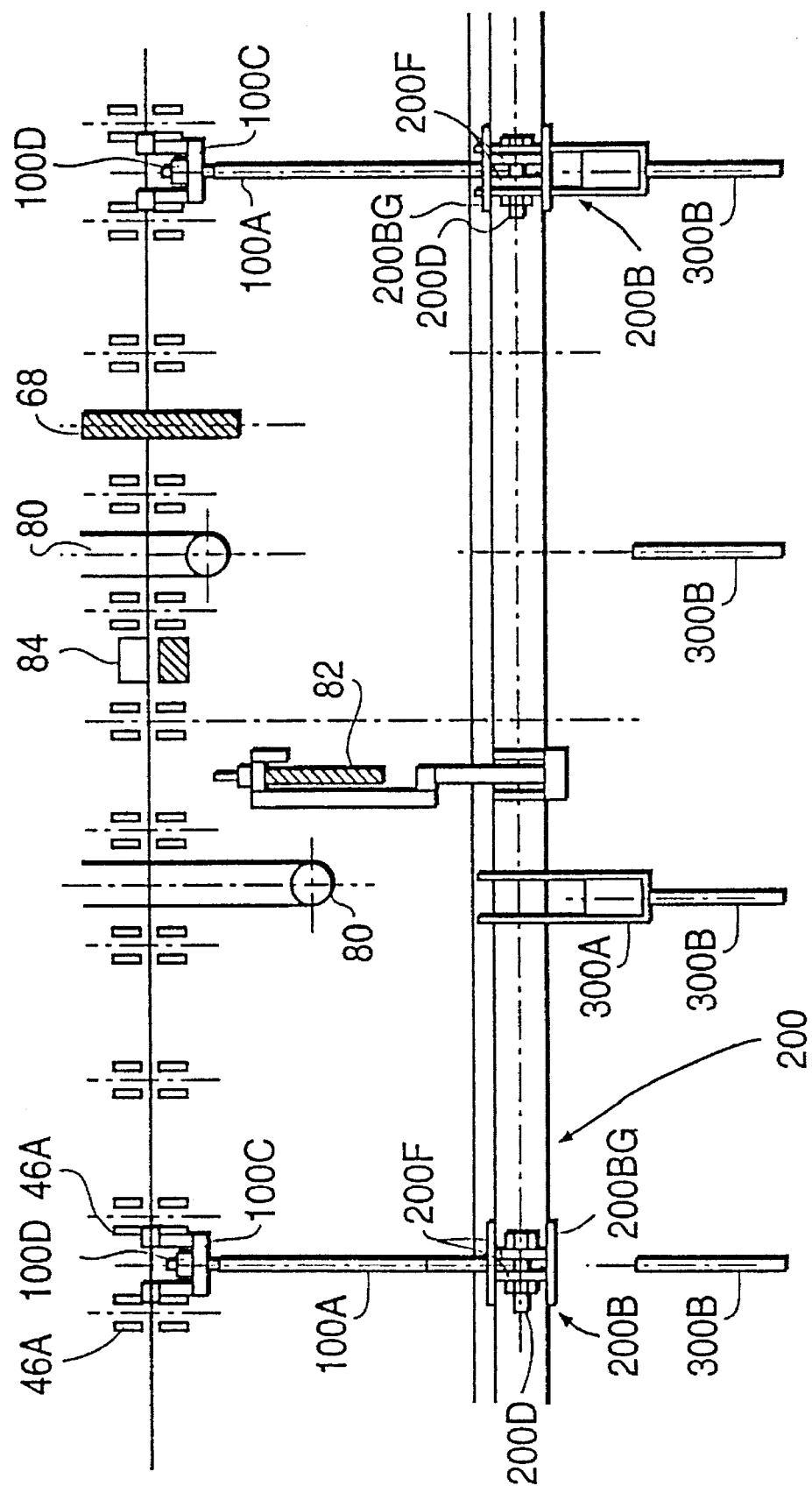

METHOD AND APPARATUS FOR SUPPORTING A SHROUD IN A NUCLEAR REACTOR

BACKGROUND OF THE INVENTION

1. Field of the Invention

The present invention relates generally to nuclear reactors. More specifically, the present invention relates to a support arrangement by way of which a shroud can be supported within a reactor pressure vessel without a need for welding, drilling, or other machining of the shroud structure.

2. Description of the Related Art

As is well known, safety is a paramount concern in devices such as nuclear reactors and stringent measures muse be exercised to ensure that mechanical failures, such as which tend to be induced by the formation of cracks and the like in various and numerous structures which comprise a nuclear reactor, are eliminated.

It has been discovered that various stresses which are induced in a shroud structure used to enclose the fuel assemblies, tend to produce cracks in the top guide support ring area of the core shroud assembly. For example, it could be envisioned the cracks could form in the shroud at the horizontal weld joint between the top guide support ring and the shroud. This, of course induces a safety concern in that, if the weld were to break, the shroud could shift and cause a problem with control rod insertion.

SUMMARY OF THE INVENTION

It is an object of the invention to provide an arrangement via which a shroud can be supported within a reactor pressure vessel (RPV) in a manner which does not induce stresses that induce cracking and the like type of deterioration of the shroud assembly, which can be connected to the shroud using only light clamping, and which does not require any welding, drilling, or other machining of the shroud assembly.

It is a further object of the present invention to provide a hanger rod arrangement via which a shroud or the like type of structure can be supported within a RPV or the like type of vessel without the need to weld, drill holes and the like.

It is yet a further object of the present invention to provide a hanger rod arrangement which makes use of a basic upper hanger rod and multi-segment ring combination and which is supplemented with lower hanger rods which are hung on the multi-segment ring and which engage a shoulder or the like on the structure being supported, in the event that vertical displacement of the suspended structure needs to be attenuated or prevented.

In brief, according to the present invention, in order to eliminate the need to weld, drill or otherwise machine a shroud structure which is used to surround a plurality of fuel assemblies in a nuclear reactor, a plurality of upper hanger rods interconnect a structure located above the shroud to a support ring assembly which is clamped about the upper periphery of the shroud below the top guide support ring assembly. Lower hanger rods interconnect the lower edge of the shroud with the support ring. Thus, through the upper and lower hanger rods and support ring assembly, the shroud can be supported within the RPV. The upper support ring is arranged to clamp the lower ends of the upper hanger rods against an upper outer peripheral portion of the shroud while the lower ends of the lower hanger rods are clamped against a lower peripheral wall portion of the shroud by a lower support ring in a manner which ensures a good connection between the lower end of the lower hanger rods and an edge such as defined by a stepped diameter portion or the like.

In a specific embodiment of the invention, the top guide support ring, together with the upper part of the shroud, is held in place by a support ring assembly that is clamped around the shroud below the top guide support ring. The support ring consists of four segments which are bolted together. The segments are formed to define a polygonal ring with 12 symmetrical sides. During installation of the shroud support ring, the ring is suspended from upper hanger rods which are spaced around the shroud. When the shroud support ring is clamped around the shroud, the upper hanger rods are clamped between the support ring and the shroud, and become an integral part of the clamping assembly. The upper end of each hanger rod has a cross bar which fits between and is supported by separator latch brackets.

To prevent vertical separation between the shroud and the top guide support ring, the shroud support ring is locked against vertical movement by a plurality (e.g. twelve) lower hanger rods, which are hooked over the shroud support ring. The lower ends of the lower hanger rods lock under a recess defined by a stepped diameter of the shroud located further down on the shroud. The lower hanger rods are maintained engaged with this recess by a lower support ring which surrounds the lower hanger rods and clamps the lower ends of these rods radially inward against the side of the shroud.

Before the shroud support ring is finally tightened in a clamping condition, the lengths of the upper hanging rods are adjusted using adjusting nuts provided at their upper ends, so the vertical installation gap between the lower hanger rods and the horizontal surface of the recess or the like located at the lower end of the shroud and against which the lower ends of the lower hanger rods engage, is closed.

It should, however, be noted that with the present invention, in the event that the risk of vertical separation between the top guide ring and the shroud is of little or no concern, the lower hanger rods and the lower support ring can be omitted, and the installation gap is closed between the upper hanger rods and the underside of the top guide support ring.

More specifically, a first aspect of the present invention resides in a nuclear reactor which features: a shroud disposed within a reactor vessel so as to surround at least one fuel assembly; and a shroud support arrangement for supporting the shroud in the reactor vessel, comprising: an upper support ring clamped about the upper periphery of the shroud; and an upper hanger rod which has a lower end engaged with the upper support ring and an upper end adapted for connection to a predetermined structure located within the reactor vessel above the shroud.

A second aspect of the present invention resides in a nuclear reactor which features: a shroud disposed within a reactor vessel so as to surround at least one fuel assembly; and a shroud support arrangement for supporting the shroud in the reactor vessel, comprising: a first multi-segment ring member disposed about the upper periphery of the shroud, the first ring member having a plurality of joints which allow the size of the ring to be adjusted and selectively clamped against the shroud; a first adjustable length hanger rod which has a lower end engaged with the first ring member and an upper end adapted for connection to a predetermined structure located within the reactor vessel above the shroud.

A third aspect of the invention resides in a support arrangement for supporting a shroud structure within a vessel, which features: a multi-segment ring assembly which can be selectively tightened about the shroud; a plurality of first hanger rods, the first hanger rods each having hook members at the lower ends thereof, the hook members being arranged to engage with the ring assembly and to be clamped against the external surface of the shroud when the ring assembly is selectively tightened, the upper ends of the first hanger rods being arranged to be engageable with a structure which is disposed in the vessel above the shroud.

A further aspect of the present invention resides in a method of supporting a shroud in a pressure vessel of a nuclear reactor comprising the steps of: suspending a plurality of upper hanger rods on a structure disposed in the pressure vessel above the level at which the shroud is suspended; connecting the plurality of upper hanger rods to a multi-segment ring member which is disposed about the shroud by arranging hooks which are provided on the lower end of the upper hanger rods to engage with the ring member so that when the ring member is tightened, portions of the hooks are pressed into engagement with the shroud; and tightening the ring member to clamp the portions of the hooks against the shroud.

BRIEF DESCRIPTION OF THE DRAWINGS

The various objects, advantages and merits of the present invention will become more clearly appreciated as a detailed description of the preferred embodiments of the invention are given in conjunction with the appended drawings in which:

FIGS. 4, 5A, 5B, 6A, 6B and 7 depict features of the upper and lower hanger rods which characterize the embodiment of the present invention;

FIG. 8 is a side view showing the arrangement of a plurality of upper and lower hanger rods and the manner in which the upper ends of the upper hanger rods can be supported on separator latch brackets; and FIG. 9 is a view similar to that shown in FIG. 8 depicting the cooperation between the top guide support ring and a shroud lift lug.

DETAILED DESCRIPTION OF THE PREFERRED EMBODIMENTS

Figure 1:
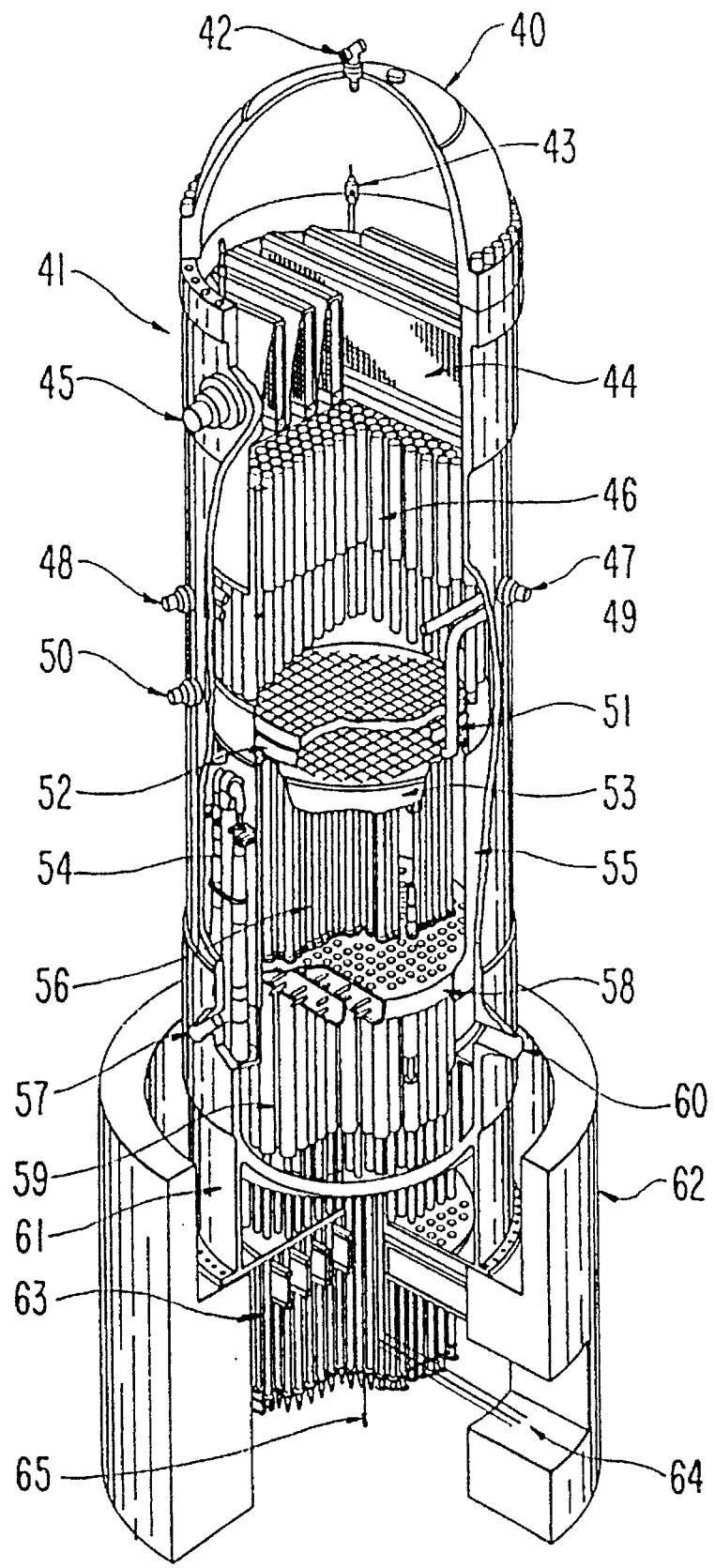
FIG. 1 is a cut-away perspective view of a nuclear reactor of a type in which the present invention is applied.

FIG. 1 is a perspective partially cut-away view of a boiling water reactor of the type to which the present invention is applicable. This BWR (boiling water reactor) includes, merely by way of example, a head 40 which is secured to the top of the reactor vessel 41, a vent and head spray 42, a steam dryer lifting lug 43, a steam drier assembly 44, a steam outlet 45, a steam separator assembly 46, a feedwater inlet 47, a core spray inlet 48, a feedwater sparger 49, a low pressure coolant injection inlet 50, a core spray line 51, a core sprayer sparger 52, a top guide 53, jet pump assemblies 54, a core shroud 55, fuel assemblies 56, a jet pump/recirculation water inlet 57, a core plate 58, control rods 59 (enclosed in elongate tubular guide thimbles), a recirculation water outlet 60, a vessel support skirt 61, a shield wall 62, control rod drive mechanisms 63, control rod drive hydraulic lines 64, and an in-core flux monitor 65.

Figure 2:
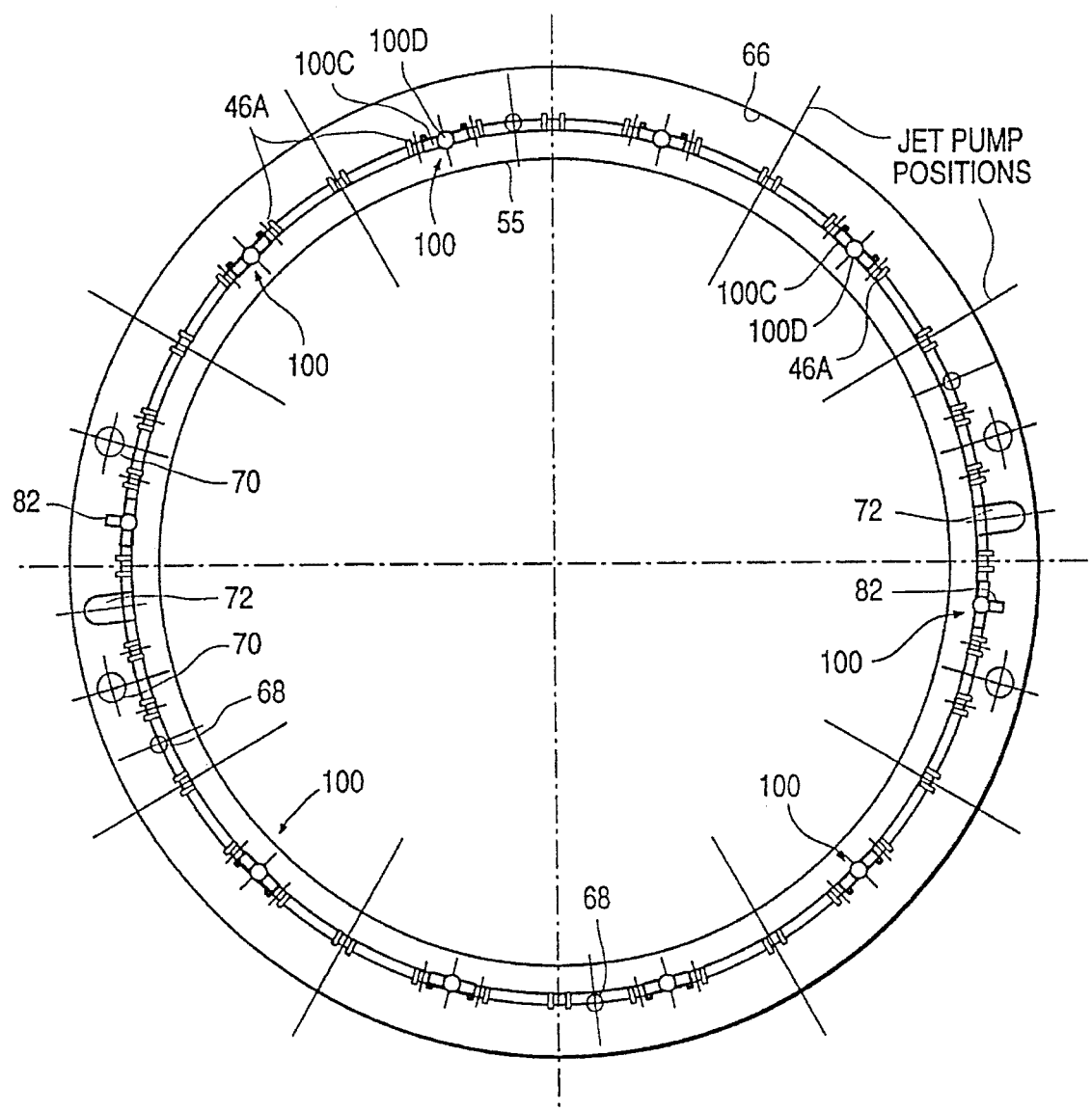
FIG. 2 is a plan view which shows a shroud disposed within a pressure vessel and which also shows the disposition of various elements, such as the jet pump positions, separator lift rods and the like, which are located in the annular space defined between the shroud and the RPV (reactor pressure vessel) wall.

FIG. 2 is plan view of the above type of reactor showing the manner in which the shroud 55 is arranged with respect to the inner periphery of the reactor pressure vessel wall 66 and the disposition of elements such as the separator lift rods 68, the core spay pipes 70, a separator guide bracket 70 and the like. This view also shows the tops of upper hanger rods 100 which form a vital part of the present invention and which will be discussed later in connection with FIGS. 4 to 7.

Figure 3:
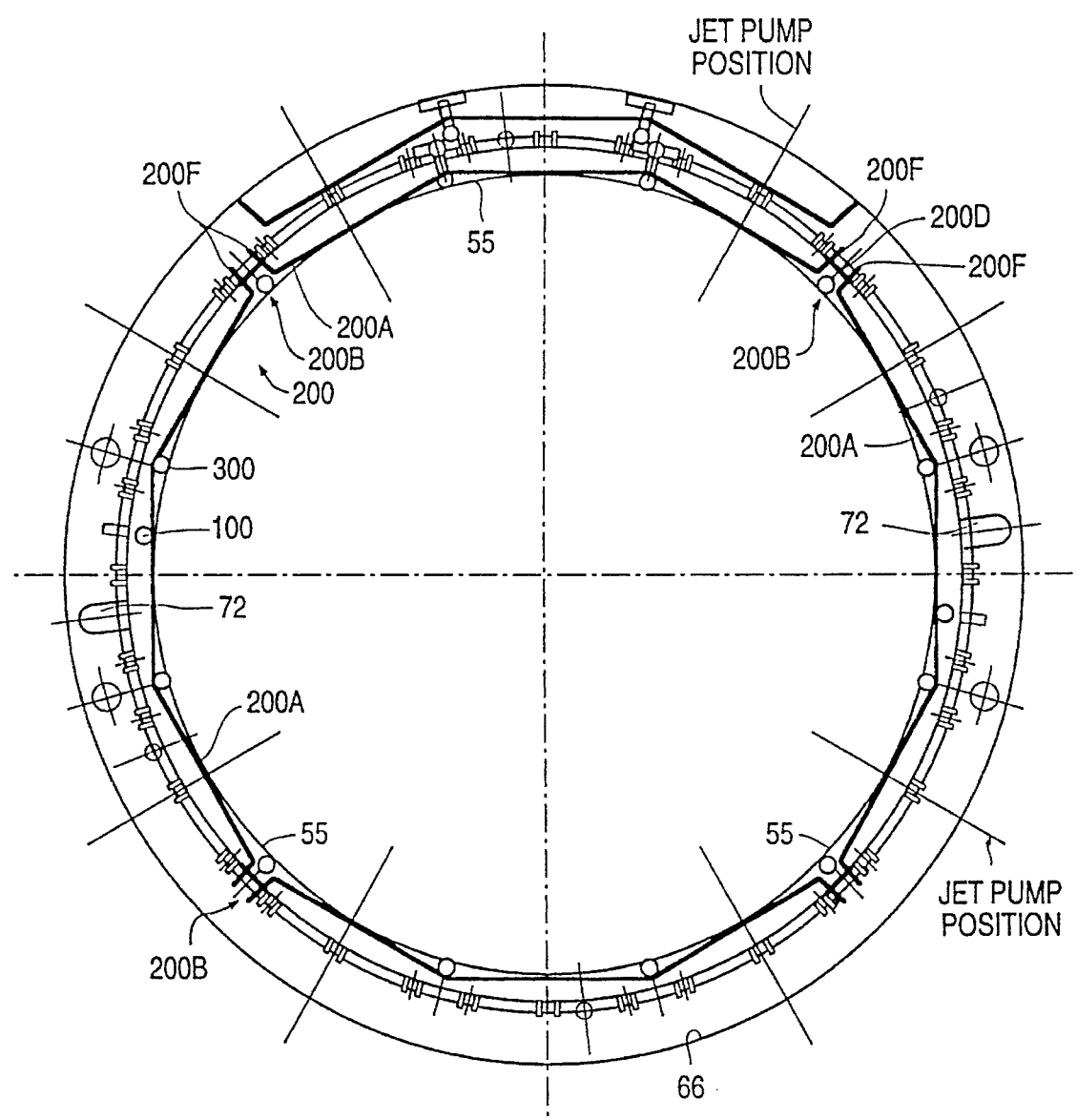
FIG. 3 is a plan view similar to that shown in FIG. 2 which shows the disposition of a shroud support ring disposed about the exterior of the shroud structure and which depicts the positioning of various upper and lower hanger rods which characterize an embodiment of the present invention.

FIG. 3 is a plan view showing a shroud support ring 200 disposed about the upper periphery of the shroud 55. As will be appreciated from this figure, the shroud support ring 200 comprises an assembly of four, three-sided members 200A which are interconnected to form a twelve sided polygonal ring member. In this instance the four segments or members 200A of the assembly are bolted together at four ring clamp sites or joints 200B which allow the shroud support ring 200 to be tightened against the outer peripheral surface of the shroud 55 at a location below the top guide ring 56. In order to improve the rigidity and strength of the joint 200B, a gusset or reinforcing plate arrangement 200BG is disposed in the illustrated manner. Note that these reinforcing plate arrangements 200BG are not shown in the plan view of FIG. 3 for the sake of illustrative clarity.

FIGS. 4 to 7 show details of the upper hanger rods 100 and associated lower hanger rods 300, and the manner in which they cooperate with the upper shroud support ring 300 and a lower support ring 400.

As shown, the upper hanger rods 100 each comprise a shaft 100A having a G clamp-like member or portion 100B at the lower end and a U-shaped bracket or cross-bar member 100C at the upper end. The U-shaped cross-bars 100C are connected to the shafts 100A by way of adjust nuts 100D. The U-shaped cross-bars 100C are each arranged to fit between two adjacent separator latch brackets 46A and are dimensioned to cooperate with these brackets 46A in a manner which allows a rigid supportive connection to be established. The G clamp-like members 100B at the lower ends of the shafts 100B are arranged to receive the upper support ring 200 in the illustrated manner. As will be appreciated, in the event that an upper hanger rod 100 is disposed at a ring clamp site 200B, the G clamp-like member 100B projects out to essentially the same level as the end portions of the flanges 200F which are formed at each end of the segments 200A.

This, as will be appreciated from FIG. 7, allows the bolt 200D which interconnects the two flanges 200F to pass through the essentially rectangular shaped aperture. The vertical wall portion 100Bw of each of the G clamp-like members 100B is arranged to have its rear edge surface trapped against the outer peripheral surface of shroud 55 by the upper support ring 200 and to be clamped in this position upon tightening of the bolts 200D which interconnect each of the segments 200A of the upper support ring 200.

The upper ends of the lower hanger rods 100 are formed with a double hook arrangement 300A (see FIGS. 6A and 6B) which hangs over the upper edge of the upper support ring 200. In the instance that an upper and lower hanger rod are disposed in vertical alignment with one another, the double hook arrangements 300A are arranged to seat on either side of the G clamp-like member 100B of the corresponding upper hanger rod 100. In the instances wherein the lower hanger rods are disposed at a joint, the double hook portion is arranged to straddle the joint and to be retained by the bolt 200D of the joint which passes behind the arrangement in a manner which traps the double hook portion in position.

The lower ends of each of the lower hanger rod shafts 300B are each formed with an enlarged head or boss portion 300C which fits in part under a stepped diameter shoulder or edge portion 55A formed on the shroud 55. The lower edge of the lower support ring 400 rests on the top of the boss portion 300C in the manner illustrated in FIGS. 6A and 7. Further, as will be apparent from FIG. 7, the lower support ring 400 is arranged to clamp the lower end portion of the shafts 300B of each of the lower hanger rods 300 against the external periphery of the shroud 55 and prevents the boss 300C at the end of each of the shafts 300B from moving laterally and outward away from the shroud 55 and thus ensures that the required supportive connection between the shroud and the lower hanger rods is maintained.

FIGS. 8 and 9 are side elevational views showing the manner in which the U-shaped cross-bars 100C of the upper hanger rods 100 fit in between and are supported by the separator latch brackets 46A. In these figures, numeral 80 denotes a core spray pipe, numeral 82 denotes a shroud lift lug, and numeral 84 denotes a separator guide bracket.

During installation of the above described shroud support ring arrangement, the upper support ring 200 is suspended by the upper hanger rods 100 which are spaced around the shroud 55. When the shroud support ring 200 is clamped around the shroud 55, the upper hanging rods 100 are clamped between the support ring 200 and the shroud 55, and become an integral part of the clamping assembly. The cross-bar 100C at the upper end of upper end of each hanger rod fits between and is supported by separator latch brackets 46A.

Vertical separation of the shroud and the top guide support ring, is prevented due to the shroud support ring 200 being locked against vertical movement by the lower hanger rods (twelve in this case), which are hung on the shroud support ring 200.

Before the shroud support ring 200 is finally tightened in a clamping condition, the lengths of the upper hanging rods 100 are adjusted using the adjusting nuts 100D provided at their upper ends. This allows the vertical installation gap, located between the boss portions 300C at the end of the lower hanger rods 300 and the horizontal surface of the stepped diameter or edge portion 55A of the shroud 55, to be closed.

It should be noted that in the event that the risk of vertical separation between the top guide ring and the shroud 55 is of little or no concern, the lower hanger rods 300 and the lower support ring 400 can be omitted, and the installation gap can be closed between the upper hanger rods 100 and the underside of the top guide support ring through adjustment of the upper hanger rod lengths.

Although the present invention has been described with reference to only one embodiment, it will be noted that the various changes and modifications which can be made without departing from the scope of the invention will be essentially self-evident and as such is limited only by the appended claims.

What is claimed is:

1. A method of supporting a shroud in a pressure vessel of a nuclear reactor comprising the steps of:

suspending a plurality of upper hanger rods on a structure disposed in said pressure vessel above the level at which said shroud is suspended;

connecting the plurality of upper hanger rods to a multi-segment ring member which is disposed about said shroud by arranging hooks which are provided on the lower end of said upper hanger rods to engage with the ring member so that when said ring member is tightened portions of said hooks are pressed into engagement with said shroud; and tightening said ring member to clamp said portions of said hooks against said shroud.

2. A method as set forth in claim 1, further comprising the steps of:

connecting lower hanger rods with said ring member;

engaging lower ends of said lower hanger rods with a predetermined portion of said shroud; and retaining the lower ends of said lower hanger rods against the outer surface of said shroud in a manner wherein engagement between the lower ends of said hanger rods and said predetermined portion of said shroud is maintained, using a second ring member.

3. A method as set forth in claim 2, further comprising the step of adjusting the length of said upper hanger rods, before said steps of tightening and after said steps of hooking so as to bring the lower ends of said lower hanger rods into engagement with said predetermined portion of said shroud.

\* \* \* \* \*